US011726770B2

(12) United States Patent
Li (10) Patent No.: US 11,726,770 B2
(45) Date of Patent: Aug. 15, 2023

(54) METHOD, DEVICE, AND APPARATUS FOR UPDATING APPLICATION PROGRAM, AND STORAGE MEDIUM

(71) Applicant: TENCENT TECHNOLOGY (SHENZHEN) COMPANY LIMITED, Guangdong (CN)

(72) Inventor: Jiaxin Li, Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 255 days.

(21) Appl. No.: 17/169,176

(22) Filed: Feb. 5, 2021

(65) Prior Publication Data

US 2021/0182052 A1    Jun. 17, 2021

Related U.S. Application Data

(63) Continuation of application No. PCT/CN2019/116449, filed on Nov. 8, 2019.

(30) Foreign Application Priority Data

Nov. 30, 2018    (CN) .......................... 2018114602230

(51) Int. Cl.
    G06F 8/654    (2018.01)
    G06F 21/57    (2013.01)

(52) U.S. Cl.
    CPC ............ *G06F 8/654* (2018.02); *G06F 21/572* (2013.01); *G06F 2221/033* (2013.01)

(58) Field of Classification Search
    CPC .................. G06F 8/654; G06F 21/572; G06F 2221/033
    See application file for complete search history.

(56) References Cited

U.S. PATENT DOCUMENTS 6,973,517 B1 * 12/2005 Golden .................. G06F 15/16
                                                      710/302
8,161,227 B1 *  4/2012 Diggs ................... G06F 3/0658
                                                      365/236

(Continued)

FOREIGN PATENT DOCUMENTS

CN    102929577 A    2/2013
CN    104484309 A    4/2015

(Continued)

OTHER PUBLICATIONS

International Search Report Issued in International Application No. PCT/CN2019/116449, dated Feb. 7, 2020 (with English translation) (6pgs).

(Continued)

*Primary Examiner* — Douglas M Slachta
(74) *Attorney, Agent, or Firm* — ArentFox Schiff LLP (57) ABSTRACT

Aspects of the disclosure can provide a method that can include acquiring a program updating request for updating an application program of a service application, where the program updating request can be used for updating a source application program to obtain a target application program. The method can further include performing control to write target firmware data to be updated matching the target application program into a target firmware region by using an update control component in a static configuration region of a field-programmable gate array (FPGA) based on the program updating request. Additionally, the method can include performing firmware update processing on a target reconfiguration region corresponding to the target application program in a dynamic configuration region of the FPGA by using the target firmware data in the target firmware region, and starting the updated target application program after the firmware update processing is completed.

20 Claims, 6 Drawing Sheets

(56) References Cited

U.S. PATENT DOCUMENTS

| | | | | |
|---|---|---|---|---|
| 9,584,130 B1* | 2/2017 | Weber | ............... | H03K 19/17736 |
| 10,031,993 B1* | 7/2018 | Poornachandran | ........................... | |
| | | | | H03K 19/17704 |
| 2016/0321113 A1* | 11/2016 | Pinto | ................... | G06F 9/45558 |
| 2017/0123779 A1* | 5/2017 | Albot | ................... | G06F 12/109 |
| 2018/0285295 A1* | 10/2018 | Abel | ................... | G06F 13/4068 |
| 2019/0278586 A1* | 9/2019 | Olarig | ..................... | G06F 8/654 |

FOREIGN PATENT DOCUMENTS

| | | | |
|---|---|---|---|
| CN | 106775869 A | 5/2017 | |
| CN | 106970778 A | 7/2017 | |
| CN | 108132792 A | 6/2018 | |
| CN | 110196729 A | 9/2019 | |

OTHER PUBLICATIONS

Written Opinion of the International Searching Authority issued in International Application No. PCT/CN2019/116449, dated Feb. 7, 2020 (4pgs).

* cited by examiner

METHOD, DEVICE, AND APPARATUS FOR UPDATING APPLICATION PROGRAM, AND STORAGE MEDIUM

RELATED APPLICATION

This application is a continuation of International Application No. PCT/CN2019/116449, filed on Nov. 8, 2019, which claims priority to Chinese Patent Application No. 2018114602230, entitled "METHOD, DEVICE, AND APPARATUS FOR UPDATING APPLICATION PROGRAM, AND STORAGE MEDIUM" filed on Nov. 30, 2018. The entire disclosures of the prior applications are hereby incorporated by reference in their entirety.

FIELD OF THE TECHNOLOGY

This application relates to the field of computers, including to application program updating technologies.

BACKGROUND OF THE DISCLOSURE

To continuously improve functional operations of application programs, it is often necessary to update algorithms and upgrade versions for the application programs. At present, when an application program in a field-programmable gate array (FPGA) cloud host is updated, the running process of the application program is usually first stopped, and then an update action is performed on firmware corresponding to the application program. After the update action on the firmware is completed, the system is powered on again to reload the updated application program. However, the foregoing updating method can be completed only after the system is powered on again, and is not only detrimental to the efficiency of automatic updating, but also causes other services in the cloud host to be interrupted.

SUMMARY

Embodiments of this application provide a method, a device, and an apparatus for updating an application program, and a storage medium.

According to an exemplary embodiment of this disclosure, a method for updating an application program is provided. The method can include acquiring a program updating request to update an application program of a service application, the program updating request can instruct an update of a source application program to obtain a target application program. The method can also include performing control to write target firmware data to be updated matching the target application program into a target firmware region by using an update control component in a static configuration region of a field-programmable gate array (FPGA) based on the program updating request. Further, the method can include performing firmware update processing on a target reconfiguration region corresponding to the target application program in a dynamic configuration region of the FPGA by using the target firmware data in the target firmware region, and starting the updated target application program after the firmware update processing is completed.

According to another aspect of the embodiments of this disclosure, a device for updating an application program can be further provided the device can include a communication interface that is configured to acquire a program updating request for requesting to update an application program of a service application. The program updating request can be used for updating a source application program to obtain a target application program. The device can further include an update processing component that is connected to the communication interface and includes a static configuration region and a dynamic configuration region. An update control component in the static configuration region can be configured to perform control to write target firmware data to be updated matching the target application program into a target firmware region, to perform firmware update processing on a target reconfiguration region by using the target firmware data in the target firmware region, and to start the updated target application program after the firmware update processing is completed. The dynamic configuration region including the target reconfiguration region can correspond to the target application program. The device can further include a communication bus that is connected to the communication interface and the update processing component and that is configured to transmit the target firmware data to the target firmware region, and to transmit the target firmware data to the target reconfiguration region.

According to yet another aspect of the embodiments of this application, an apparatus for updating an application program is further provided. The apparatus can include an acquiring unit that is configured to acquire a program updating request that requests an update of the application program of a service application. The program updating request can be used for updating a source application program to obtain a target application program. The apparatus can further include a control unit that is configured to perform control to write target firmware data to be updated matching the target application program into a target firmware region by using an update control component in a static configuration region of a field-programmable gate array (FPGA) based on the program updating request. Additionally, the apparatus can include an updating unit that is configured to perform firmware update processing on a target reconfiguration region corresponding to the target application program in a dynamic configuration region of the FPGA by using the target firmware data in the target firmware region, and a processing unit that is configured to start the updated target application program after the firmware update processing is completed.

According to still yet another aspect of the embodiments of this disclosure, a storage medium is further provided. The storage medium stores a computer program that, when executed by a processor, causes the processor to perform the foregoing method for updating an application program when run.

In the embodiments of this application, after the program updating request for requesting to update the application program of the service application is acquired, the program updating request can be used for updating a source application program to obtain a target application program. The control is performed by using the update control component in the static configuration region of the FPGA to write the target firmware data to be updated matching the target application program into the target firmware region. Subsequently, the firmware update processing can be performed on the target reconfiguration region corresponding to the target application program in the dynamic configuration region of the FPGA by using the target firmware data in the target firmware region. Further, the updated target application program is started after the firmware update processing is completed.

In the method provided in the embodiments of this disclosure, the FPGA is divided into a static configuration region and a dynamic configuration region. The dynamic configuration region is divided into a plurality of reconfigurable regions, and each reconfiguration region corresponds to an application program. When the source application program needs to be updated to the target application program, the control can be performed by using the update control component in the static configuration region to write the target firmware data to be updated matching the target application program into the target firmware region, and then the firmware update processing is directly performed on the target reconfiguration region corresponding to the target application program in the dynamic configuration region of the FPGA by using the target firmware data in the target firmware region without need of powering on the FPGA again, thereby avoiding interrupting normal running of other service applications in the FPGA, to improve the update smoothness of updating the application program.

BRIEF DESCRIPTION OF THE DRAWINGS

Various exemplary embodiments of this disclosure that are proposed as examples will be described in detail with reference to the following figures, wherein like numerals reference like elements, and wherein.

DESCRIPTION OF EMBODIMENTS

Exemplary embodiments of this application are clearly and completely described below with reference to the accompanying drawings in the embodiments of this disclosure. The described embodiments are merely some rather than all of the embodiments of this disclosure. Other embodiments obtained by a person skilled in the art based on the embodiments of this disclosure also fall within the protection scope of this disclosure.

The terms such as "first" and "second" in the specification, the claims, and the foregoing accompanying drawings of this application are intended to distinguish between similar objects, but are not necessarily used for describing a particular sequence or a chronological order. It is to be understood that the data termed in such a way are interchangeable in proper circumstances, so that the embodiments of this disclosure described herein can be implemented in other orders than the order illustrated or described herein. Moreover, the terms "include", "comprise" and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Figure 1:
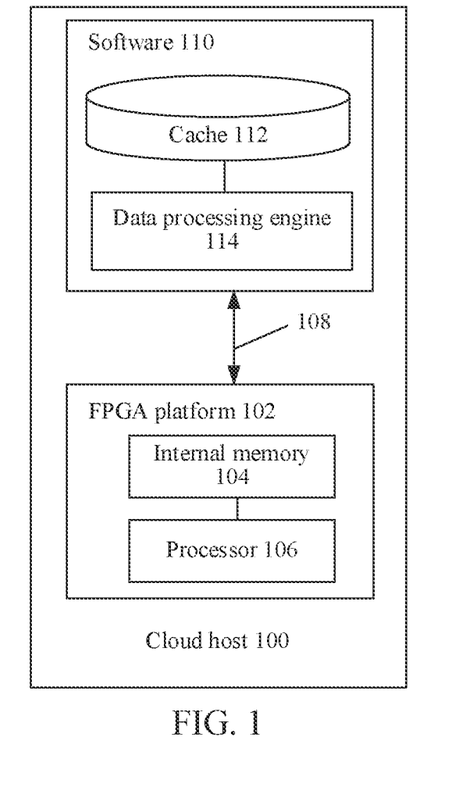
FIG. 1 is a schematic diagram of an application environment of an optional method for updating an application program according to an embodiment of this application.

According to an aspect of the embodiments of this disclosure, a method for updating an application program is provided. In an optional implementation, the method for updating an application program may be applied to, but is not limited to, a hardware environment shown in FIG. 1. As shown in FIG. 1, a cloud host 100 in an environment based on a field-programmable gate array (FPGA) includes an FPGA platform 102 and software 110. The FPGA platform 102 includes an internal memory 104 and a processor 106. The internal memory 104 is configured to store firmware data to be updated corresponding to each application program, and the processor 106 is configured to update a requested source application program according to a program updating request to obtain a target application program. The FPGA platform 102 may, but is not limited to, exchange data with the software 110 by using a bus 108. The software 110 includes a cache 112 and a data processing engine 114. The cache 112 is configured to temporarily store data to be exchanged, and the data processing engine 114 is configured to process the data to be exchanged.

After a program updating request for requesting to update an application program of a service application is acquired, the control is performed by using an update control component in a static configuration region of the FPGA platform 102 to write target firmware data to be updated matching the target application program into a target firmware region, and then the firmware update processing is performed on a target reconfiguration region corresponding to the target application program in a dynamic configuration region of the FPGA platform 102 by using the target firmware data in the target firmware region. The updated target application program is started after the firmware update processing is completed.

In this embodiment, the FPGA is divided into a static configuration region and a dynamic configuration region. The dynamic configuration region is divided into a plurality of reconfigurable regions, and each reconfiguration region corresponds to an application program. When the source application program needs to be updated to the target application program, the control is performed by using the update control component in the static configuration region to write the target firmware data to be updated matching the target application program into the target firmware region, and then the firmware update processing is directly performed on the target reconfiguration region corresponding to the target application program in the dynamic configuration region of the FPGA by using the target firmware data in the target firmware region without need of powering on the FPGA again, thereby avoiding interrupting normal running of other service applications in the FPGA, to improve the update smoothness of updating the application program.

Optionally, the cloud host 100 may be, but is not limited to, a terminal that can run application programs, such as a mobile phone, a tablet computer, a notebook computer, a PC, and other devices. The software 110 may be, but is not limited to, a functional program data package for controlling the FPGA platform in the cloud host.

Figure 2:
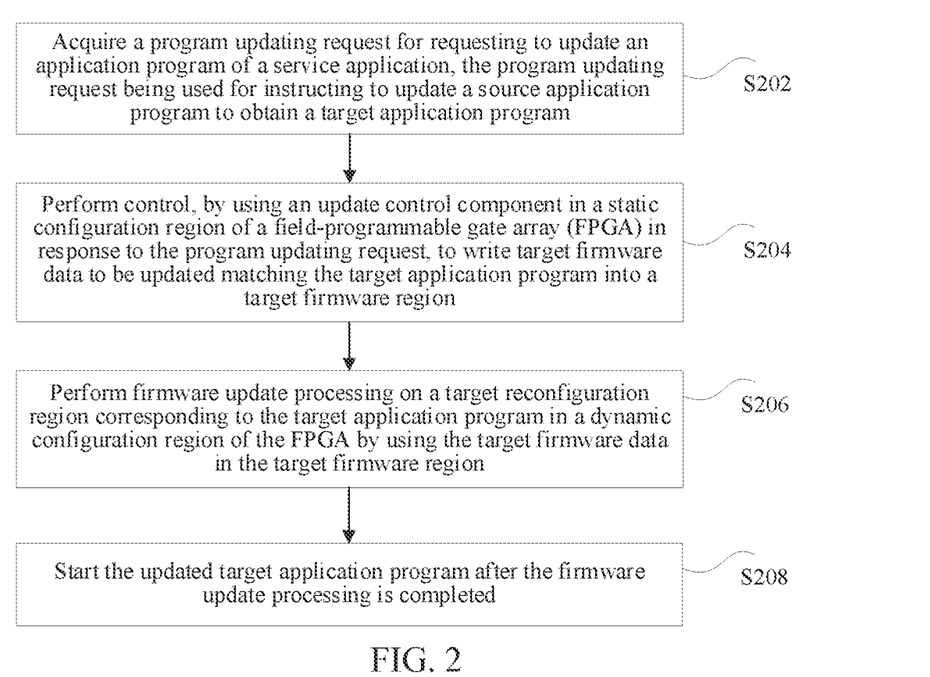
FIG. 2 is a schematic flowchart of an optional method for updating an application program according to an embodiment of this application.

In an optional implementation, as shown in FIG. 2, the foregoing method for updating an application program can include the following.

In step S202, the method can acquire a program updating request for requesting to update an application program of a service application, the program updating request being used for instructing to update a source application program to obtain a target application program.

In step S204, the method can perform control, by using an update control component in a static configuration region of a field-programmable gate array (FPGA) in response to the program updating request, to write target firmware data to be updated matching the target application program into a target firmware region.

In step S206, the method can perform firmware update processing on a target reconfiguration region corresponding to the target application program in a dynamic configuration region of the FPGA by using the target firmware data in the target firmware region.

In step S208, the method can start the updated target application program after the firmware update processing is completed.

Optionally, in this embodiment, the foregoing method for updating a program may be applied to, but is not limited to, a scenario in which the application program of the service application implemented based on the FPGA is updated, and the service application may include, but is not limited to, a gene application. In a case that an application program of the gene application needs to be updated while an algorithm of the gene application is updated, the method for updating a program provided in this embodiment may be used to synchronize update changes on a software side of the gene application to the corresponding FPGA firmware to dynamically update the application program of the gene application.

In this embodiment, the FPGA can be divided into a static configuration region and a dynamic configuration region. The dynamic configuration region is divided into a plurality of reconfigurable regions, and each reconfiguration region corresponds to an application program. When the source application program needs to be updated to the target application program, the control is performed by using the update control component in the static configuration region to write the target firmware data to be updated matching the target application program into the target firmware region, and then the firmware update processing is directly performed on the target reconfiguration region corresponding to the target application program in the dynamic configuration region of the FPGA by using the target firmware data in the target firmware region without need of powering on the FPGA again, thereby avoiding interrupting normal running of other service applications in the FPGA, to improve the update smoothness of updating the application program.

Optionally, in this embodiment, the FPGA may include, but is not limited to, a static configuration region and a dynamic configuration region. The static configuration region may include, but is not limited to: an update control component configured to control a process of updating the application program. After FPGA factory firmware is updated, the static configuration region is not dynamically updated. The dynamic configuration region may be obtained in, but not limited to, the following manner: allocate the corresponding dynamic configuration region to each service application in the FPGA before the program updating request is acquired; and divide the dynamic configuration region into one or more reconfiguration regions to form a reconfiguration region set. Each reconfiguration region in the reconfiguration region set corresponds to an application program. The foregoing division of the dynamic configuration region may be determined, but not limited to, according to requirements of the service application.

Figure 3:
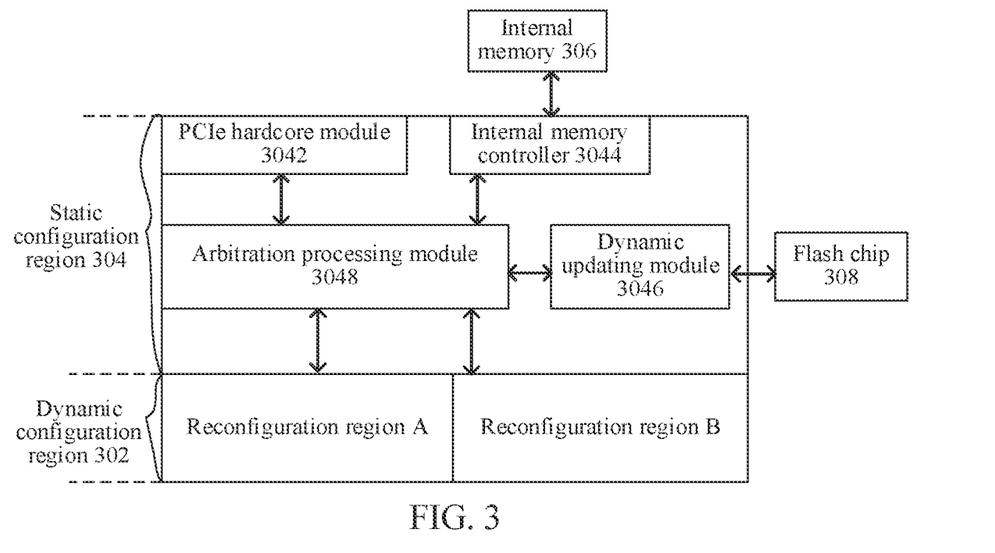
FIG. 3 is a schematic diagram of an optional structure for implementing a method for updating an application program according to an embodiment of this application.

For example, as shown in FIG. 3, the method for updating an application program provided in this embodiment may be applied to, but is not limited to, the structure shown in FIG. 3. The FPGA is divided into a dynamic configuration region 302 and a static configuration region 304. In addition, the FPGA further includes an internal memory 306 and a Flash chip 308. The dynamic configuration region 302 is divided into at least two reconfiguration regions, a reconfiguration region A and a reconfiguration region B, respectively. The update control component in the static configuration region 304 includes: a high-speed serial computer expansion bus standard (peripheral component interconnect express, PCIe) hardcore module 3042, an internal memory controller 3044, an arbitration processing module 3048, and a dynamic updating module 3046. The PCIe hardcore module 3042 is configured to control communication and write the target firmware data to be updated from the software side into the internal memory 306 by using the internal memory controller 3044. The internal memory controller 3044 is configured to perform control to store the target firmware data to be updated into the internal memory 306 and perform readback verification. The dynamic updating module 3046 is configured to perform control to write the target firmware data into the target firmware region of the Flash chip, and further configured to read the target firmware data to complete the program update. The arbitration processing module 3048 is connected to the PCIe hardcore module 3042, the internal memory controller 3044, and the dynamic updating module 3046 that are in the static configuration region 304, and is configured to exchange data with each reconfiguration region to ensure that the reconfiguration regions are mutually independent.

Figure 4:
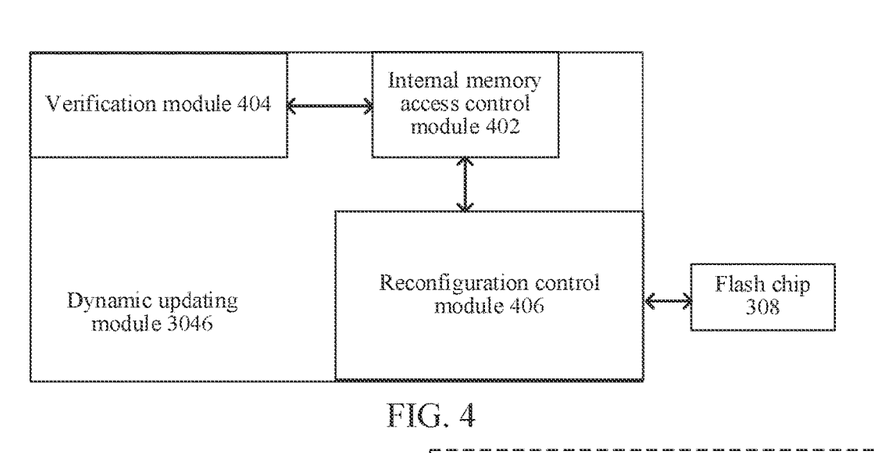
FIG. 4 is a schematic diagram of another optional structure for implementing a method for updating an application program according to an embodiment of this application.

Further, the structure in the dynamic updating module 3046 may be, but not limited to, shown in FIG. 4. The dynamic updating module 3046 may include, but is not limited to: an internal memory access control module 402, a verification module 404, and a reconfiguration control module 406. The internal memory access control module 402 is configured to communicate with the internal memory controller 3044, the verification module 404 is configured to verify the target firmware data, and the reconfiguration control module 406 is configured to perform control to write the target firmware data into the Flash chip 308 according to interface requirements and timing requirements of the Flash chip 308.

Optionally, in this embodiment, the foregoing program updating request may, but is not limited to, carry an object identifier of an update object, and an updating mode. The object identifier of the update object may include, but is not limited to, a program identifier for indicating the source application program before update, and a program identifier of the target application program after update. The updating mode may be, but is not limited to, a manner for instructing to update the source application program to the target application program. The updating mode herein may include, but is not limited to, one of the following: a replacement updating mode and an extension updating mode. The replacement updating mode may, but is not limited to, replace the source application program with the target application program to implement the overall update of the source application program. The extension updating mode may, but is not limited to, extend or add the target application program in a case that the source application program is running normally to implement the partial update of the source application program.

Optionally, before the firmware update processing is performed on the target reconfiguration region corresponding to the target application program by using the target firmware data, this embodiment may include, but is not limited to: parsing the program updating request by using the update control component to acquire an updating mode indicated by the program updating request and a program identifier of the target application program; and determining the target reconfiguration region corresponding to the target application program from a reconfiguration region set corresponding to the dynamic configuration region according to the updating mode and the program identifier.

For example, description is made with reference to FIG. 3. It is assumed that the dynamic configuration region is pre-divided to obtain: the reconfiguration region A corresponding to the source application program A, and the reconfiguration region B corresponding to the target application program B. In a case that the updating mode is indicated as the replacement updating mode, it is determined to replace the source application program A with the target application program B. Searching is performed in the reconfiguration region set of the dynamic configuration region according to the program identifier ID-B of the target application program B carried in the program updating request. If a first reconfiguration region is found, that is, the reconfiguration region B, the firmware update processing is performed on the reconfiguration region B as the target reconfiguration region.

Optionally, after the firmware update processing is completed, this embodiment may further include acquiring a firmware updating status. In a case that the firmware updating status indicates that the update fails, the foregoing program updating process may, but is not limited to, be re-performed, until the firmware updating status indicates that the update succeeds. In a case that the number of times of update failing reaches a predetermined threshold, a firmware updating failure is determined, and the failure is reported to the software side for analysis and processing.

Figure 5:
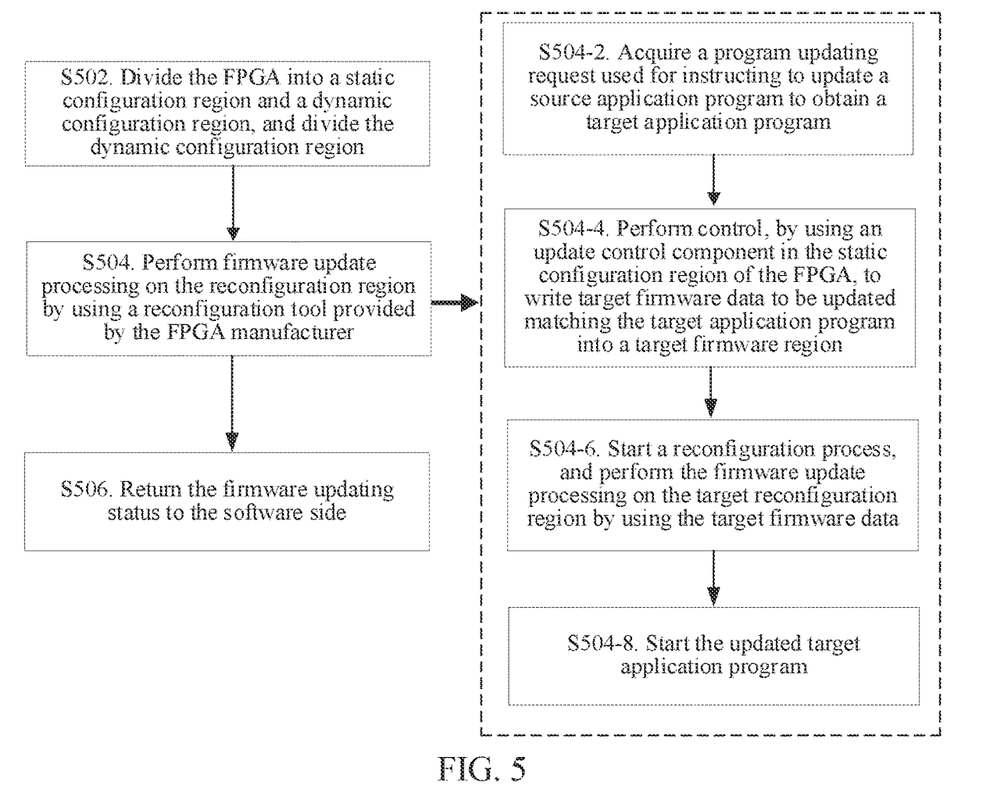
FIG. 5 is a schematic diagram of another optional method for updating an application program according to an embodiment of this application.

The foregoing method for updating a program is illustrated specifically with reference to an example shown in FIG. 5, and the steps may be as follows.

In step S502, the method can divide the FPGA into a static configuration region and a dynamic configuration region. According to application requirements of actual service applications, the dynamic configuration region is divided into at least two reconfiguration regions. According to a dynamically reconfigurable process provided by an FPGA manufacturer, a bitstream file corresponding to the reconfiguration region is generated as an update configuration file.

In step S504, the method can perform firmware update processing on the reconfiguration region by using a reconfiguration tool provided by the FPGA manufacturer. The process can be as follows.

In step S504-2, the method can acquire a program updating request used for instructing to update a source application program to obtain a target application program.

In step S504-4 the method can perform control by using an update control component in the static configuration region of the FPGA to write target firmware data to be updated matching the target application program into a target firmware region.

The control performed by using the update control component includes: writing the target firmware data to be updated from the software side into the internal memory corresponding to the FPGA by using the PCIe hardcore module, then completing the operation of readback verification of the target firmware data in the internal memory, and then writing the target firmware data into the target firmware region of the Flash chip by using the dynamic updating module.

In step S504-6, the method can start a reconfiguration process, and perform the firmware update processing on the target reconfiguration region by using the target firmware data. Optionally, the Flash chip may be, but is not limited to, an off-chip Flash chip.

In step S504-8, the method can start the updated target application program.

In step S506, the method can return the firmware updating status to the software side. If the firmware updating status indicates that the update fails, step S504 is re-performed until the update succeeds. If an error or failing still occurs after several times of updates, a failure status is reported to the software side for subsequent processing.

In this embodiment, the FPGA is divided into a static configuration region and a dynamic configuration region. The dynamic configuration region is divided into a plurality of reconfigurable regions, and each reconfiguration region corresponds to an application program. When the source application program needs to be updated to the target application program, the control is performed by using the update control component in the static configuration region to write the target firmware data to be updated matching the target application program into the target firmware region, and then the firmware update processing is directly performed on the target reconfiguration region corresponding to the target application program in the dynamic configuration region of the FPGA by using the target firmware data in the target firmware region without need of powering on the FPGA again, thereby avoiding interrupting normal running of other service applications in the FPGA, to improve the update smoothness of updating the application program.

As an optional solution, before the performing firmware update processing on a target reconfiguration region corresponding to the target application program in a dynamic configuration region of the FPGA by using the target firmware data in the target firmware region, the method can further include the following steps.

In step S1, the method can parse the program updating request by using the update control component to acquire an updating mode indicated by the program updating request and a program identifier of the target application program.

In step S2, the method can determine the target reconfiguration region corresponding to the target application program from a reconfiguration region set corresponding to the dynamic configuration region according to the updating mode and the program identifier.

Optionally, in this embodiment, the updating mode obtained by parsing the program updating request may include, but is not limited to, a replacement updating mode and an extension updating mode. The replacement updating mode may, but is not limited to, replace the source application program with the target application program to implement the overall update of the source application program; and the extension updating mode may, but is not limited to, extend or add the target application program in a case that the source application program is running normally to implement the partial update of the source application program.

Further, in this embodiment, the update control component may communicate with a software side underlying driver by using the PCIe hardcore module in the update control component, to acquire the program updating request, and parse the program updating request to obtain the updating mode and the program identifier of the target application program, thereby helping to transmit the target firmware data to be updated corresponding to the target application program to the internal memory by using the internal memory controller to further perform data verification.

In this embodiment, the internal memory may be, but is not limited to, a double data rate synchronous dynamic random access memory (DDR SDRAM), and the corresponding internal memory controller may be, but is not limited to, a DDR controller.

In this embodiment, the update control component may further include an arbitration processing module configured to connect the PCIe hardcore module and the internal memory controller to implement data transmission. In addition, the arbitration processing module is further connected to the dynamic updating module, and is configured to write the target firmware data to be updated corresponding to the target application program into the target firmware region, corresponding to the target application program, in the Flash chip by using the dynamic updating module. In addition, the arbitration processing module is further configured to acquire the target firmware data by using the dynamic updating module, and dynamically update the reconfiguration region by using the target firmware data.

Figure 6:
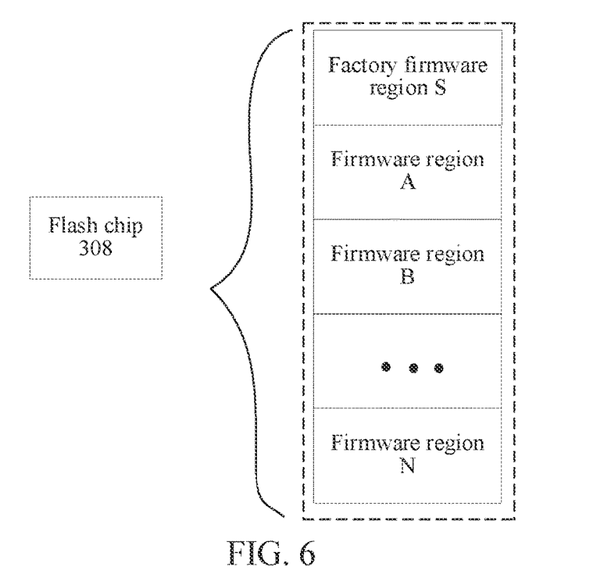
FIG. 6 is a schematic diagram of still another optional structure for implementing a method for updating an application program according to an embodiment of this application.

In this embodiment, the Flash chip may include, but is not limited to: a factory firmware region, and a firmware region corresponding to the application program. As shown in FIG. 6, in the Flash chip 308, the factory firmware region S corresponds to the static configuration region, and the firmware region A, the firmware region B, . . . , to the firmware region N respectively correspond to the reconfiguration regions in the dynamic configuration region.

Optionally, in this embodiment, the determining the target reconfiguration region corresponding to the target application program from a reconfiguration region set corresponding to the dynamic configuration region may include one of the following.

1) Determine to replace the source application program with the target application program identified by the program identifier in a case that the updating mode is a replacement updating mode; search for a first reconfiguration region in the reconfiguration region set of the dynamic configuration region according to the program identifier, the first reconfiguration region storing functional data of the target application program for replacing the source application program; and determine the first reconfiguration region as the target reconfiguration region.

Figure 7:
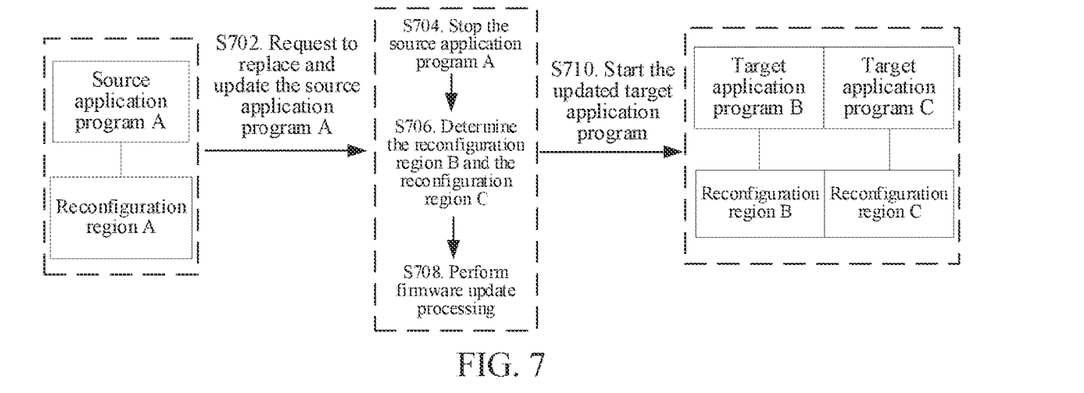
FIG. 7 is a schematic diagram of replacement updating of an optional method for updating an application program according to an embodiment of this application.

For example, as shown in FIG. 7, it is assumed that the dynamic configuration region includes: a reconfiguration region A corresponding to the source application program A, a reconfiguration region B corresponding to the target application program B, and a reconfiguration region C corresponding to the target application program C. In step S702, the program updating request is parsed, to learn that the updating mode is the replacement updating mode. That is, it is determined that the program updating request is used for requesting to replace and update the source application program A with the target application program B and the target application program C. The source application program A stops running. According to the program identifier ID-B of the target application program B and the program identifier ID-C of the target application program C that are carried in the program updating request, searching is performed in the reconfiguration region set of the dynamic configuration region. If the reconfiguration region B corresponding to the target application program B and the reconfiguration region C corresponding to the target application program C are found, the reconfiguration region B and the reconfiguration region C are determined as the target reconfiguration region, and then the firmware update processing is performed on the target reconfiguration region, such as steps S704-S708. Finally, step S710 is performed, that is, the updated target application program is started, and the updated application data in the reconfiguration region B and the reconfiguration region C is loaded.

2) Determine to add the target application program identified by the program identifier based on the source application program in a case that the updating mode is an extension updating mode, search for a second reconfiguration region in the reconfiguration region set of the dynamic configuration region according to the program identifier, the second reconfiguration region storing functional data of the target application program to be added, and determine the second reconfiguration region as the target reconfiguration region.

Figure 8:
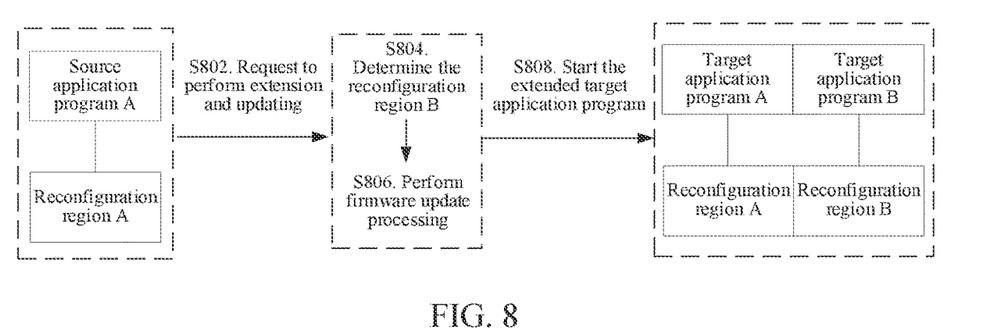
FIG. 8 is a schematic diagram of extension updating of an optional method for updating an application program according to an embodiment of this application.

For example, as shown in FIG. 8, it is assumed that the dynamic configuration region includes a reconfiguration region A corresponding to the source application program A and a reconfiguration region B corresponding to the target application program B. In step S802, the program updating request is parsed, to learn that the updating mode is the extension updating mode, that is, it is determined that the target application program B is requested to be extended and updated based on the source application program A. According to the program identifier ID-B of the target application program B carried in the program updating request, searching is performed in the reconfiguration region set of the dynamic configuration region. If the reconfiguration region B corresponding to the target application program B is found, the reconfiguration region B is determined as the target reconfiguration region, and then the firmware update processing is performed on the target reconfiguration region, such as steps S804-S806. Finally, step S808 is performed, that is, the updated target application program is started, and the updated application data in the reconfiguration region B is loaded.

Optionally, the foregoing program updating request may, but is not limited to, include an identifier for indicating the updating mode. In this embodiment, the updating mode may, but is not limited to, be indicated with specific characters agreed in advance. The specific characters may be, but are not limited to, any one or a combination of letters, numbers, symbols, and the like. For example, agreed characters are used as an example, and it is assumed that "1" is used to indicate the replacement updating mode and "2" is used to indicate the extension updating mode. After the program updating request is acquired, the program updating request is parsed. When the character "1" is obtained by parsing, the updating mode is determined to be the replacement updating mode. When the character "2" is obtained by parsing, the updating mode is determined to be the extension updating mode.

Through this embodiment, after the program updating request is acquired, the program updating request is parsed, and the updating mode indicated by the program updating request and the program identifier of the target application program are acquired, to determine the target reconfiguration region through the updating mode and the program identifier to further accurately locate the target reconfiguration region where the firmware update processing will be performed, so that the update process requested by the program updating request is quickly completed, thereby dynamically updating the application program and improving update efficiency.

As an optional solution, the determining the target reconfiguration region corresponding to the target application program from a reconfiguration region set corresponding to the dynamic configuration region includes the following.

In step S1, the program can determine a region location of the target reconfiguration region corresponding to the target firmware data in the reconfiguration region set by using an arbitration processing module in the update control component, the arbitration processing module being configured to exchange data with each reconfiguration region in the reconfiguration region set.

Optionally, in this embodiment, the arbitration processing module may, but is not limited to, be connected to the PCIe hardcore module, the internal memory controller, and the dynamic updating module that are in the update control component, be configured to transmit the target firmware data corresponding to the target application program among the PCIe hardcore module, the internal memory controller, and the dynamic updating module, and be further configured to exchange data with each reconfiguration region in the dynamic configuration region to ensure that the reconfiguration regions are mutually independent.

Details are described with reference to FIG. 3. The PCIe hardcore module 3042 acquires the target firmware data to be updated sent by the software side underlying driver, and the arbitration processing module 3048 acquires the target firmware data from the PCIe hardcore module 3042 and sends the target firmware data to the internal memory controller 3044 to write the target firmware data into the internal memory 306. In addition, the arbitration processing module 3048 may further write the target firmware data into the target firmware region of the Flash chip 308 by using the dynamic updating module 3046. Further, the arbitration processing module 3048 acquires the target firmware data in the target firmware region of the Flash chip 308 by using the dynamic updating module 3046, and exchange data with the determined target reconfiguration region (assumed to be the reconfiguration region B) by using the target firmware data, to complete the firmware update processing on the target reconfiguration region.

Through the embodiments provided in this application, the arbitration processing module in the update control component has a connection relationship with each of other components, and may implement real-time communication with other components in the static configuration region. In addition, the arbitration processing module exchanges data with each reconfiguration region in the dynamic configuration region to dynamically update the reconfiguration region. Under the condition of ensuring the independence of the reconfiguration region, the firmware update processing on the reconfiguration region may be completed without powering on again, which improves the smoothness of updating the application program.

As an optional solution, the performing control by using an update control component in the static configuration region of the FPGA to write target firmware data to be updated matching the target application program into a target firmware region includes the following.

In step S1, the program can perform control by using the update control component to write the target firmware data into a target address in an internal memory, and verify the target firmware data in the target address.

In step S2, the program can write the target firmware data that passes the verification into the target firmware region, corresponding to the target application program, in a hardware memory, the hardware memory being configured to store the application program of the service application.

Optionally, in this embodiment, the internal memory may be, but is not limited to, a double data rate synchronous dynamic random access memory (DDR SDRAM). Further, in this embodiment, the hardware memory may be, but is not limited to, an off-chip Flash chip. The Flash chip may include, but is not limited to a factory firmware region corresponding to the static configuration region and a firmware region corresponding to each reconfiguration region in the dynamic configuration region.

For example, with reference to FIG. 3 and FIG. 6, it is assumed that, after the program updating request is parsed, it is determined to replace the source application program A with the target application program B. In the dynamic configuration region, the source application program A corresponds to the reconfiguration region A, and the target application program B corresponds to the reconfiguration region B. The update control component performs control to write the target firmware data into a target address in an internal memory and verifies the target firmware data in the target address. After the update control component completes the verification on the target firmware data corresponding to the target application program B, the target firmware data that passes the verification is written into the Flash chip 308. As shown in FIG. 6, in the Flash chip 308, the factory firmware region S corresponds to the static configuration region, and the firmware region A, the firmware region B, . . . , to the firmware region N respectively correspond to the reconfiguration regions in the dynamic configuration region. In this example, the target firmware data corresponding to the target application program B is written into the firmware region B corresponding to the reconfiguration region B.

Through this embodiment, the control is performed by using the update control component to write the target firmware data into the target address in the internal memory, and the target firmware data in the target address is verified; and then the target firmware data that passes the verification is written into the target firmware region, corresponding to the target application program, in the hardware memory, so that the firmware update processing is completed based on the target firmware data that passes the verification by the update control component, to avoid the problem of program update failing caused by data abnormalities, thereby improving program update efficiency.

As an optional solution, the writing the target firmware data that passes the verification into the target firmware region, corresponding to the target application program, in a hardware memory includes the following.

In step S1, process can perform control, by using a reconfiguration control module in the update control component, to write the target firmware data into the target firmware region, the reconfiguration control module being configured to perform control to write the target firmware data into the target firmware region according to a timing transmission condition matching the hardware memory through an interface corresponding to the hardware memory.

Optionally, in this embodiment, the reconfiguration control module may, but is not limited to, be located in the dynamic updating module of the update control component. The reconfiguration control module may include, but is not limited to: a reconfiguration implementation component, a Flash data verification component, and a Flash controller. The reconfiguration implementation component is configured to perform a transmission operation according to interface and timing transmission conditions provided by the FPGA manufacturer. The Flash data verification component is configured to perform consistency verification of writing and reading back on the target firmware data to ensure the validity and consistency of the written data, thereby ensuring the stability and correctness of the firmware update processing.

Figure 9:
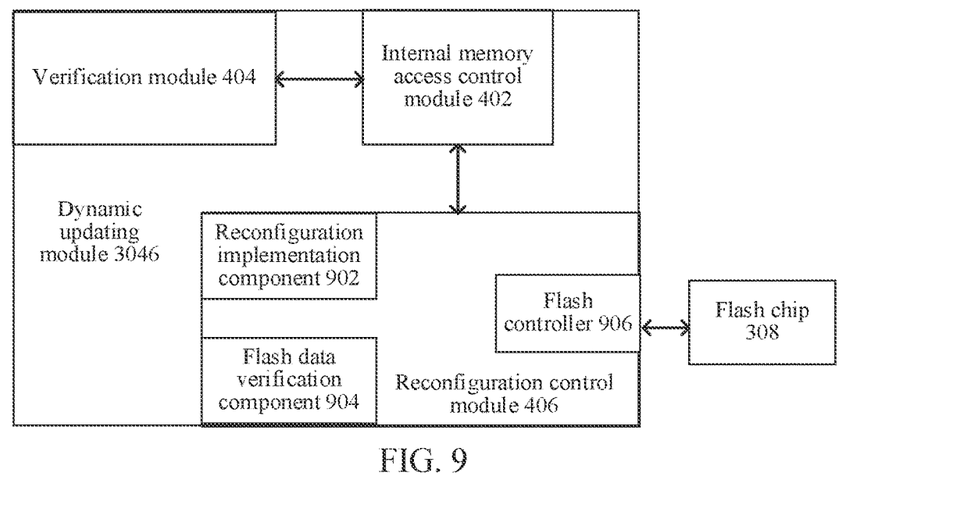
FIG. 9 is a schematic diagram of still yet another optional structure for implementing a method for updating an application program according to an embodiment of this application.

Details are described with reference to FIG. 9. The reconfiguration control module 406 performs, by using the Flash data verification component 904, the consistency verification of writing and reading back on the target firmware data to be written into the target firmware region. After the target firmware data passes the verification, the target firmware data is written into the target firmware region in the Flash chip 308 by using the Flash controller 906. The foregoing process is implemented through the control performed by the reconfiguration implementation component 902.

Through this embodiment, the control is performed by using the reconfiguration control module to write the target firmware data into the target firmware region, so that the writing process meets performance requirements such as interface, timing and function performance requirements of the hardware memory, thereby avoiding abnormalities in the program update to ensure the accuracy and effectiveness of the writing.

As an optional solution, the performing control by using the update control component to write the target firmware data into a target address in an internal memory, and verifying the target firmware data in the target address includes the following.

In step S1, the process can perform control by using an internal memory access control module in the update control component to write the target firmware data into the target address in the internal memory.

In step S2, the process can perform readback verification on the target firmware data by using a verification module in the update control component.

Optionally, in this embodiment, the internal memory access control module and the verification module may, but are not limited to, be located in the dynamic updating module of the update control component. The internal memory access control module may, but is not limited to, communicate with the internal memory controller in the update control component. The verification module is configured to perform consistency verification of writing and reading back on the target firmware data to ensure the validity and consistency of the written data, thereby ensuring the stability and correctness of the firmware update processing.

Through this embodiment, a plurality of times of verifications are performed on the target firmware data to be written to ensure the validity of the written data, thereby ensuring the stability and correctness of the program update control.

To make the description simple, the foregoing method embodiments are stated as a series of action combinations. However, a person skilled in the art needs to know that this application is not limited to the described sequence of the actions because according to this application, some steps may use another sequence or may be simultaneously performed. In addition, a person skilled in the art shall also be aware that all the embodiments described in the specification are exemplary embodiments, and the related actions and modules are not necessarily mandatory to this application.

Figure 10:
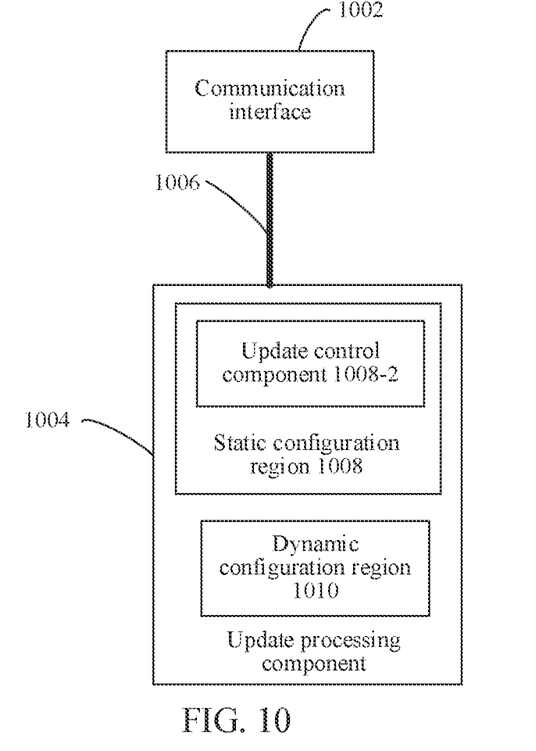
FIG. 10 is a schematic structural diagram of an optional device for updating an application program according to an embodiment of this application.

According to another aspect of the embodiments of this application, a device for updating an application program is further provided. The device may also, but is not limited to, be applied to the hardware environment shown in FIG. 1. Details are not described again in this embodiment. As an optional example, as shown in FIG. 10, the device for updating an application program can include:

(1) a communication interface 1002 that is configured to acquire a program updating request for requesting to update an application program of a service application, the program updating request being used for instructing to update a source application program to obtain a target application program;

(2) an update processing component 1004 that is connected to the communication interface 1002 and including a static configuration region and a dynamic configuration region, an update control component in the static configuration region being configured to perform control to write target firmware data to be updated matching the target application program into a target firmware region; further configured to perform firmware update processing on a target reconfiguration region by using the target firmware data in the target firmware region; and further configured to start the updated target application program after the firmware update processing is completed; and the dynamic configuration region including the target reconfiguration region corresponding to the target application program; and (3) a communication bus 1006 that is connected to the communication interface 1002 and the update processing component 1004, configured to transmit the target firmware data to the target firmware region, and further configured to transmit the target firmware data to the target reconfiguration region.

Optionally, in this embodiment, the foregoing device for updating a program may be applied to, but is not limited to, a scenario in which the application program of the service application implemented based on the FPGA is updated, and the service application may include, but is not limited to, a gene application. In a case that an application program of the gene application needs to be updated while an algorithm of the gene application is updated, the device for updating a program provided in this embodiment may be used to synchronize update changes on a software side of the gene application to the corresponding FPGA firmware to dynamically update the application program of the gene application.

In this embodiment, as shown in FIG. 10, the update processing component 1004 of the FPGA is divided into a static configuration region 1008 and a dynamic configuration region 1010. The dynamic configuration region is divided into a plurality of reconfigurable regions, and each reconfiguration region corresponds to an application program. When the source application program needs to be updated to the target application program, the control is performed by using the update control component 1008-2 in the static configuration region to write the target firmware data to be updated matching the target application program into the target firmware region, and then the firmware update processing is directly performed on the target reconfiguration region corresponding to the target application program in the dynamic configuration region of the FPGA by using the target firmware data in the target firmware region without need of powering on the FPGA again, thereby avoiding interrupting normal running of other service applications in the FPGA, to improve the update smoothness of updating the application program.

Optionally, in this embodiment, the static configuration region may include, but is not limited to an update control component configured to control a process of updating the application program. After FPGA factory firmware is updated, the static configuration region is not dynamically updated. The dynamic configuration region may be obtained in, but not limited to, the following manner: allocate the corresponding dynamic configuration region to each service application in the FPGA before the program updating request is acquired; and divide the dynamic configuration region into one or more reconfiguration regions to form a reconfiguration region set. Each reconfiguration region in the reconfiguration region set corresponds to an application program. The foregoing division of the dynamic configuration region may be determined, but not limited to, according to requirements of the service application.

Optionally, in this embodiment, the update control component in the static configuration region may include, but is not limited to an arbitration processing module and a dynamic updating module. The arbitration processing module is connected to the dynamic configuration region and is configured to exchange data with each reconfiguration region corresponding to the dynamic configuration region. The dynamic updating module is connected to the arbitration processing module. The dynamic updating module includes: 1) an internal memory access control module, connected to the arbitration processing module and configured to perform control to write the target firmware data into the target address in the internal memory; 2) a verification module, connected to the internal memory access control module and configured to perform readback verification on the target firmware data; and 3) a reconfiguration control module, connected to the verification module and configured to perform control to write the target firmware data into the target firmware region according to a timing transmission condition matching a hardware memory through an interface corresponding to the hardware memory. Of course, it should be understood that one or more of the modules described in this disclosure can be implemented by hardware, such as circuitry.

Details are described with reference to the examples shown in FIG. 3, FIG. 4, FIG. 6, and FIG. 8. Here, it is assumed that the update control component in the static configuration region 304 may include, but is not limited to a PCIe hardcore module 3042, an internal memory controller 3044, an arbitration processing module 3048, and a dynamic updating module 3046. The dynamic updating module 3046 may include, but is not limited to an internal memory access control module 402, a verification module 404, and a reconfiguration control module 406. It is assumed that the dynamic configuration region 302 includes a reconfiguration region A corresponding to the source application program A and a reconfiguration region B corresponding to the target application program B. The program updating request is parsed, to learn that the updating mode is the extension updating mode, that is, the target application program B is extended or added based on the source application program A. In the Flash chip 308, the factor firmware region S corresponds to the static configuration region, and the firmware region A, the firmware region B, . . . , to the firmware region N respectively correspond to the reconfiguration regions in the dynamic configuration region.

The PCIe hardcore module 3042 acquires the target firmware data to be updated from the software side underlying driver, and transmits the target firmware data to the internal memory controller 3044 by using the arbitration processing module 3048. The internal memory controller 3044 is configured to perform control to write the target firmware data into the internal memory 306 and perform readback verification. Then, the arbitration processing module 3048 writes the target firmware data into the target firmware region, corresponding to the target application program, in the Flash chip 308 by using the dynamic updating module 3046. Then, the arbitration processing module 3048 exchanges data with the dynamic configuration region to complete the firmware update processing.

According to the program identifier ID-B of the target application program B carried in the program updating request, searching is performed in the reconfiguration region set of the dynamic configuration region. If it is found that the reconfiguration region B is the target reconfiguration region, the firmware update processing is performed on the target reconfiguration region, and then the updated target application program is started and the updated application data in the reconfiguration region B corresponding to the target application program B is loaded.

In the process in which the arbitration processing module 3048 writes the target firmware data into the target firmware region, corresponding to the target application program, in the Flash chip 308 by using the dynamic updating module 3046, the processing of the dynamic updating module 3046 includes exchanging data with the internal memory controller 3044 by using the internal memory access control module 402, re-verifying the target firmware data by using the verification module 404, and then performing the writing operation by using the reconfiguration control module 406 according to performance requirements corresponding to the Flash chip.

Figure 11:
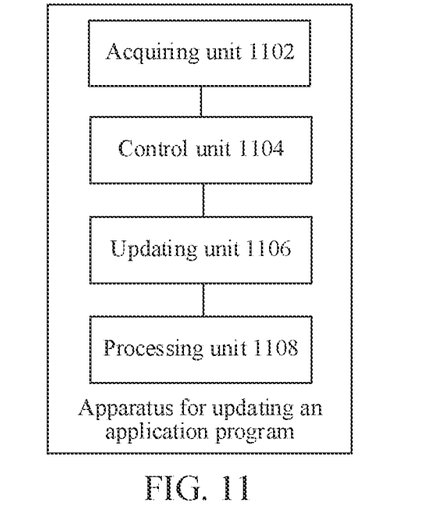
FIG. 11 is a schematic structural diagram of an optional apparatus for updating an application program according to an embodiment of this application.

According to still another aspect of the embodiments of this application, an apparatus for updating an application program used for implementing the foregoing method for updating an application program is further provided, which is set to perform the steps in any one of the foregoing method embodiments during running. As shown in FIG. 11, the apparatus includes:

1) an acquiring unit 1102 that is configured to acquire a program updating request for requesting to update an application program of a service application, the program updating request being used for instructing to update a source application program to obtain a target application program;

2) a control unit 1104 that is configured to perform control, by using an update control component in a static configuration region of a field-programmable gate array (FPGA) in response to the program updating request, to write target firmware data to be updated matching the target application program into a target firmware region;

3) an updating unit 1106 that is configured to perform firmware update processing on a target reconfiguration region corresponding to the target application program in a dynamic configuration region of the FPGA by using the target firmware data in the target firmware region; and 4) a processing unit 1108 that is configured to start the updated target application program after the firmware update processing is completed.

Optionally, in this embodiment, the foregoing apparatus for updating a program may be applied to, but is not limited to, a scenario in which the application program of the service application implemented based on the FPGA is updated, and the service application may include, but is not limited to, a gene application. In a case that an application program of the gene application needs to be updated while an algorithm of the gene application is updated, the apparatus for updating a program provided in this embodiment may be used to synchronize update changes on a software side of the gene application to the corresponding FPGA firmware to dynamically update the application program of the gene application.

In this embodiment, the FPGA is divided into a static configuration region and a dynamic configuration region. The dynamic configuration region is divided into a plurality of reconfigurable regions, and each reconfiguration region corresponds to an application program. When the source application program needs to be updated to the target application program, the control is performed by using the update control component in the static configuration region to write the target firmware data to be updated matching the target application program into the target firmware region, and then the firmware update processing is directly performed on the target reconfiguration region corresponding to the target application program in the dynamic configuration region of the FPGA by using the target firmware data in the target firmware region without need of powering on the FPGA again, thereby avoiding interrupting normal running of other service applications in the FPGA, to improve the update smoothness of updating the application program.

Optionally, in this embodiment, the apparatus further includes a parsing unit that is configured to parse the program updating request by using the update control component to acquire an updating mode indicated by the program updating request and a program identifier of the target application program before firmware update processing is performed on a target reconfiguration region corresponding to the target application program in a dynamic configuration region of the FPGA by using the target firmware data in the target firmware region, and a determining unit that is configured to determine the target reconfiguration region corresponding to the target application program from a reconfiguration region set corresponding to the dynamic configuration region according to the updating mode and the program identifier.

Optionally, in this embodiment, the determining unit can include a first determining module that is configured to determine to replace the source application program with the target application program identified by the program identifier in a case that the updating mode is a replacement updating mode, search for a first reconfiguration region in the reconfiguration region set according to the program identifier, the first reconfiguration region storing functional data of the target application program for replacing the source application program; and determine the first reconfiguration region as the target reconfiguration region, and a second determining module, configured to determine to add the target application program identified by the program identifier based on the source application program in a case that the updating mode is an extension updating mode; search for a second reconfiguration region in the reconfiguration region set according to the program identifier, the second reconfiguration region storing functional data of the target application program to be added; and determine the second reconfiguration region as the target reconfiguration region.

Optionally, in this embodiment, the determining unit can include a third determining module that is configured to determine a region location of the target reconfiguration region corresponding to the target firmware data in the reconfiguration region set by using an arbitration processing module in the update control component, the arbitration processing module being configured to exchange data with each reconfiguration region in the reconfiguration region set corresponding to the dynamic configuration region.

Optionally, in this embodiment, the control unit can include a first writing module that is configured to perform control by using the update control component to write the target firmware data into a target address in an internal memory, and verify the target firmware data in the target address; and a second writing module, configured to write the target firmware data that passes the verification into the target firmware region, corresponding to the target application program, in a hardware memory, the hardware memory being configured to store the application program of the service application.

Optionally, in this embodiment, the second writing module can include a writing sub-module that is configured to perform control, by using a reconfiguration control module in the update control component, to write the target firmware data into the target firmware region, the reconfiguration control module being configured to perform control to write the target firmware data into the target firmware region according to a timing transmission condition matching the hardware memory through an interface corresponding to the hardware memory.

Optionally, in this embodiment, the first writing module can include a control sub-module that is configured to perform control by using an internal memory access control module in the update control component to write the target firmware data into the target address in the internal memory; and a verification sub-module, configured to perform readback verification on the target firmware data by using a verification module in the update control component.

Optionally, in this embodiment, the apparatus can further include an allocating unit that is configured to allocate the corresponding dynamic configuration region to each service application in the FPGA before the program updating request for requesting to update the application program of the service application is acquired; and a dividing unit that is configured to divide the dynamic configuration region into one or more reconfiguration regions to obtain the reconfiguration region set.

The apparatus provided in this embodiment is used for implementing various embodiments provided in the foregoing method for updating a program. In this embodiment, details are not described herein again.

According to still another aspect of the embodiments of this application, a storage medium is further provided. The storage medium stores a computer program, the computer program being set to perform steps in any one of the foregoing method embodiments when run.

Optionally, in this embodiment, the storage medium may be set to store a computer program for performing the following steps:

In step S1, the program can acquire a program updating request for requesting to update an application program of a service application, the program updating request being used for instructing to update a source application program to obtain a target application program.

In step S2, the program perform control, by using an update control component in a static configuration region of a field-programmable gate array (FPGA) in response to the program updating request, to write target firmware data to be updated matching the target application program into a target firmware region.

In step S3, the program perform firmware update processing on a target reconfiguration region corresponding to the target application program in a dynamic configuration region of the FPGA by using the target firmware data in the target firmware region.

In step S4, the program start the updated target application program after the firmware update processing is completed.

Optionally, in this embodiment, a person of ordinary skill in the art may understand that all or some of the steps of the methods in the foregoing embodiments may be implemented by a program indicating relevant hardware of the terminal device. The program may be stored in a non-transitory computer-readable storage medium. The storage medium may include a flash disk, a read-only memory (ROM), a random access memory (RAM), a magnetic disk, an optical disc, and the like.

The sequence numbers of the foregoing embodiments of this application are merely for description purpose but do not indicate the preference of the embodiments.

In a case that the integrated unit in the foregoing embodiments is implemented in the form of a software function unit and sold or used as an independent product, the integrated unit may be stored in the foregoing non-transitory computer-readable storage medium. Based on such an understanding, the technical solutions of this application essentially, or the part contributing to the existing technology, or all or some of the technical solutions may be implemented in a form of a software product. The computer software product is stored in a storage medium and includes several indications for indicating one or more computer devices (which may be a personal computer, a server, a network device, or the like) to perform all or some of the steps of the methods described in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that the disclosed client can be implemented in other manners. The described apparatus embodiments are merely exemplary. For example, the unit division is merely logical function division and may be other division during actual implementation. For example, a plurality of units or components may be combined or integrated into another system, or some features may be ignored or not performed. In addition, the coupling, or direct coupling, or communication connection between the displayed or discussed components may be the indirect coupling or communication connection through some interfaces, units, or modules, and can be in electrical or other forms.

The units described as separate parts may or may not be physically separate. Parts displayed as units may or may not be physical units, and may be located in one position, or may be distributed on a plurality of network units. Some or all of the units can be selected according to actual requirements to achieve the objectives of the solutions in the embodiments.

In addition, functional units in the embodiments of this application may be integrated into one processing unit, or each of the units can exist alone physically, or two or more units are integrated into one unit. The integrated unit may be implemented in a form of hardware, such as circuitry, or may be implemented in a form of a software functional unit.

The foregoing descriptions are merely exemplary implementations of this application. A person of ordinary skill in the art can further make several improvements and refinements without departing from the principle of this application, and the improvements and refinements shall fall within the protection scope of this application.

What is claimed is:

1. A method for updating an application program that is applicable to a terminal, the method comprising:
   acquiring a program updating request that requests an update of the application program of a service application, the program updating request indicating an updating mode for updating a source application program to obtain a target application program;
   performing control to write target firmware data to be updated matching the target application program into a target firmware region by using an update control component in a static configuration region of a field-programmable gate array (FPGA) based on the program updating request;
   performing firmware update processing on a target reconfiguration region corresponding to the target application program in a dynamic configuration region of the FPGA to update the source application program to obtain the target application program based on the target firmware data in the target firmware region according to the updating mode, the performing the firmware update processing including (i) replacing the source application program with the target application program in the target reconfiguration region according to the updating mode being a first updating mode and (ii) adding the target application program to the target reconfiguration region according to the updating mode being a second updating mode; and
   starting the target application program after the firmware update processing is completed.

2. The method according to claim 1, wherein, before the performing the firmware update processing on the target reconfiguration region, the method further comprises:
   parsing the program updating request by using the update control component to acquire the updating mode indicated by the program updating request and a program identifier of the target application program; and
   determining the target reconfiguration region corresponding to the target application program from a reconfiguration region set corresponding to the dynamic configuration region based on the updating mode and the program identifier.

3. The method according to claim 2, wherein the determining the target reconfiguration region corresponding to the target application program further comprises:
   when the first updating mode is a replacement updating mode,
      determining to replace the source application program with the target application program identified by the program identifier,
      searching for a first reconfiguration region in the reconfiguration region set based on the program identifier, the first reconfiguration region storing functional data of the target application program for replacing the source application program, and
      determining the first reconfiguration region as the target reconfiguration region; and
   when the second updating mode is an extension updating mode,
      determining to add the target application program identified by the program identifier based on the source application program,
      searching for a second reconfiguration region in the reconfiguration region set based on the program identifier, the second reconfiguration region storing functional data of the target application program to be added, and determining the second reconfiguration region as the target reconfiguration region.

4. The method according to claim 2, wherein the determining the target reconfiguration region corresponding to the target application program comprises:
   determining a region location of the target reconfiguration region corresponding to the target firmware data in the reconfiguration region set by using an arbitration processing module in the update control component, the arbitration processing module being configured to exchange data with each reconfiguration region in the reconfiguration region set.

5. The method according to claim 1, wherein the performing the control to write the target firmware data further comprises:
   performing control by using the update control component to write the target firmware data to a target address in an internal memory, and verifying the target firmware data in the target address; and
   writing the target firmware data that passes the verification into the target firmware region, corresponding to the target application program, in a hardware memory that is configured to store the application program of the service application.

6. The method according to claim 5, wherein the writing the target firmware data that passes the verification further comprises:
   performing control to write the target firmware data into the target firmware region by using a reconfiguration control module in the update control component, the reconfiguration control module being configured to perform control to write the target firmware data into the target firmware region based on a timing transmission condition matching the hardware memory through interface circuitry corresponding to the hardware memory.

7. The method according to claim 5, wherein the performing the control to write the target firmware data further comprises:
   performing control to write the target firmware data into the target address in the internal memory by using an internal memory access control module in the update control component; and
   performing readback verification on the target firmware data by using a verification module in the update control component.

8. The method according to claim 1, wherein, before the acquiring the program updating request, the method further comprises:
   allocating the dynamic configuration region to the service application in the FPGA; and
   dividing the dynamic configuration region into reconfiguration regions to obtain a reconfiguration region set.

9. A device for updating an application program, comprising:
   communication interface circuitry that is configured to acquire a program updating request that requests an update of the application program of a service application, the program updating request indicating an updating mode for updating a source application program to obtain a target application program;
   processing circuitry that is coupled to the communication interface circuitry and includes a static configuration region and a dynamic configuration region, an update control component in the static configuration region of the processing circuitry being configured to:
      perform control to write target firmware data to be updated matching the target application program into a target firmware region,
      perform firmware update processing on a target reconfiguration region to update the source application program to obtain the target application program by using the target firmware data in the target firmware region according to the updating mode, the firmware update processing including (i) replacing the source application program with the target application program in the target reconfiguration region according to the updating mode being a first updating mode and (ii) adding the target application program to the target reconfiguration region according to the updating mode being a second updating mode, and
      start the target application program after the firmware update processing is completed, where the dynamic configuration region includes the target reconfiguration region corresponding to the target application program; and
   a communication bus that is coupled to the communication interface circuitry and the processing circuitry and is configured to transmit the target firmware data to the target firmware region and transmit the target firmware data to the target reconfiguration region.

10. The device according to claim 9, wherein the update control component of the processing circuitry further comprises:
    an arbitration processing module coupled to the dynamic configuration region and that is configured to exchange data with each reconfiguration region in a reconfiguration region set corresponding to the dynamic configuration region.

11. The device according to claim 10, wherein the update control component of the processing circuitry further comprises a dynamic updating module that is coupled to the arbitration processing module and includes:
    an internal memory access control module coupled to the arbitration processing module that is configured to perform control to write the target firmware data into a target address in the internal memory;
    a verification module coupled to the internal memory access control module and that is configured to perform readback verification on the target firmware data; and
    a reconfiguration control module coupled to the verification module and that is configured to perform control to write the target firmware data into the target firmware region based on a timing transmission condition matching a hardware memory through interface circuitry corresponding to the hardware memory.

12. An apparatus for updating an application program, comprising:
    processing circuitry configured to:
       acquire a program updating request that requests an update of the application program of a service application, the program updating request indicating an updating mode for updating a source application program to obtain a target application program;
       perform control to write target firmware data to be updated matching the target application program into a target firmware region by using an update control component in a static configuration region of a field-programmable gate array (FPGA) based on the program updating request;
       perform firmware update processing on a target reconfiguration region corresponding to the target application program in a dynamic configuration region of the FPGA to update the source application program to obtain the target application program based on the target firmware data in the target firmware region according to the updating mode, the firmware update processing including (i) replacing the source application program with the target application program in the target reconfiguration region according to the updating mode being a first updating mode and (ii) adding the target application program to the target reconfiguration region according to the updating mode being a second updating mode; and start the target application program after the firmware update processing is completed.

13. The apparatus according to claim 12, wherein, before the firmware update processing on the target reconfiguration region is performed, the processing circuitry is further configured to:

parse the program updating request by using the update control component to acquire the updating mode indicated by the program updating request and a program identifier of the target application program; and determine the target reconfiguration region corresponding to the target application program from a reconfiguration region set corresponding to the dynamic configuration region based on the updating mode and the program identifier.

14. The apparatus according to claim 13, wherein processing circuitry is configured to:

when the first updating mode is a replacement updating mode, determine to replace the source application program with the target application program identified by the program identifier, search for a first reconfiguration region in the reconfiguration region set based on the program identifier, the first reconfiguration region storing functional data of the target application program for replacing the source application program, and determine the first reconfiguration region as the target reconfiguration region; and when the second updating mode is an extension updating mode, determine to add the target application program identified by the program identifier based on the source application program, search for a second reconfiguration region in the reconfiguration region set based on the program identifier, the second reconfiguration region storing functional data of the target application program to be added, and determine the second reconfiguration region as the target reconfiguration region.

15. The apparatus according to claim 13, wherein the the processing circuitry is configured to:

a determine region location of the target reconfiguration region corresponding to the target firmware data in the reconfiguration region set by using an arbitration processing unit of the processing circuitry to exchange data with each reconfiguration region in the reconfiguration region set.

16. The apparatus according to claim 12, wherein the processing circuitry is configured to:

perform control by using the update control component to write the target firmware data to a target address in an internal memory, and verify the target firmware data in the target address; and write the target firmware data that passes the verification into the target firmware region, corresponding to the target application program, in a hardware memory that is configured to store the application program of the service application.

17. The apparatus according to claim 16, wherein the processing circuitry is configured to:

perform control to write the target firmware data into the target firmware region by using a reconfiguration control unit of the processing circuitry that is configured to perform control to write the target firmware data into the target firmware region based on a timing transmission condition matching the hardware memory through interface circuitry corresponding to the hardware memory.

18. The apparatus according to claim 16, wherein the processing circuitry is configured to:

perform control to write the target firmware data into the target address in the internal memory by using an internal memory access control unit in the processing circuitry; and perform readback verification on the target firmware data by using a verification unit in the processing circuitry.

19. The apparatus according to claim 12, wherein, before the program updating request is acquired, the processing circuitry is further configured to:

allocate the dynamic configuration region to the service application in the FPGA; and divide the dynamic configuration region into reconfiguration regions to obtain a reconfiguration region set.

20. A non-transitory computer readable storage medium storing a program that, when executed by a processor, causes the processor to perform the method according to claim 1.

* * * * *